United States Patent [19]
Harada

[11] Patent Number: 4,598,545
[45] Date of Patent: Jul. 8, 1986

[54] POWER TRANSMISSION CONTROL APPARATUS

[75] Inventor: Denzaburo Harada, Katano, Japan

[73] Assignee: Kubota, Ltd., Osaka, Japan

[21] Appl. No.: 712,071

[22] Filed: Mar. 15, 1985

[30] Foreign Application Priority Data

Sep. 29, 1984 [JP] Japan ............................ 59-148336[U]

[51] Int. Cl.$^4$ ............................................. F16D 25/10
[52] U.S. Cl. ......................................... 60/435; 91/31;
192/3.51; 192/87.13; 192/87.19; 137/625.3
[58] Field of Search ................... 60/435, 436; 91/6, 31;
192/3.51, 87.13, 87.18, 87.19; 137/625.3

[56] References Cited

U.S. PATENT DOCUMENTS

| 3,339,363 | 9/1967 | Quayle ................................. 60/436 |
| 3,757,915 | 9/1973 | Momose ............................ 192/87.19 |
| 4,093,051 | 6/1978 | Kreitzberg ..................... 192/87.19 X |
| 4,132,153 | 1/1979 | Grotness et al. ............ 137/625.3 X |
| 4,253,553 | 3/1981 | Yamada et al. .............. 192/87.19 X |

Primary Examiner—A. Michael Chambers
Assistant Examiner—John C. Fox
Attorney, Agent, or Firm—Cushman, Darby & Cushman

[57] ABSTRACT

There is disclosed a power transmission control apparatus having a clutching function and a modulating function and enabling a vehicle installed with this apparatus to make a sudden start after a clutch has been disengaged. The apparatus includes a main change speed control valve (V2), a backward and forward switch valve (V1), a modulation valve (MV) and an inching valve (IV).

2 Claims, 7 Drawing Figures

POWER TRANSMISSION CONTROL APPARATUS

BACKGROUND OF THE INVENTION

This invention relates to a power transmission control apparatus. More particularly, the invention relates to a power transmission control apparatus comprising a main change speed control valve of a power transmission, a hydraulic pump for supplying pressure oil to the main change speed control valve, hydraulic cylinders for controlling clutches, a modulation valve disposed between the main change speed control valve and the hydraulic pump for gradually increasing a hydraulic pressure for the hydraulic cylinders after the hydraulic cylinders are filled with the pressure oil by operating the main change speed control valve to connect the hydraulic pump to the hydraulic cylinders, and a backward and forward switch valve connected to an output port of the modulation valve through an inching valve for controlling the clutches. Such an apparatus has a modulating function played by the modulation valve whereby a vehicle installed with this apparatus does not make a sudden start when the main change speed control valve is operated, and a clutching function in which a depression of the clutch pedal causes the inching valve to stop oil supply to the backward and forward switch valve thereby stopping the vehicle running.

Conventionally this type of control apparatus is devised to permit the vehicle to make a slow or gentle start only, i.e. to start at a speed corresponding to an amount of return of the clutch pedal after the clutch is disengaged, when the clutch pedal is suddenly released after the clutch is disengaged, a great amount of oil is supplied from the output port of the modulation valve to the backward and forward switch valve through the inching valve. This lowers a hydraulic pressure at the output port of the modulation valve, resulting in the modulating function. Since it takes time to recover a required pressure, the vehicle is incapable of a sudden start.

Consequently, the conventional control apparatus has the disadvantage that the working vehicle cannot carry out an efficient operation, for example, by means of a sudden start to cause a shovel loader to burst into soil.

SUMMARY OF THE INVENTION

The object of this invention is to provide a power transmission control apparatus permitting a working vehicle to make a sudden start after the clutch is disengaged, besides having a clutching function and a modulating function.

In order to achieve the above object, a power transmission control apparatus comprises a main change speed control valve of a power transmission, a hydraulic pump for supplying pressure oil to the main change speed control valve, hydraulic cylinders for controlling clutches, a modulation valve disposed between the main change control valve and the hydraulic pump for gradually increasing a hydraulic pressure for the hydraulic cylinders after the hydraulic cylinders are filled with the pressure oil by operating the main change speed control valve to connect the hydraulic pump to the hydraulic cylinders, and a backward and forward switch valve connected to an output port of the modulation valve through an inching valve for controlling the clutches, wherein the inching valve comprises a valve casing, a tubular spool slidable in the valve casing, and a spindle slidable in and relative to the spool and operatively connected to a clutch pedal. The valve casing and the spool define therebetween a first oil chamber connected to the output port of the modulation valve, a second oil chamber in communication with an output port defined in the valve casing and connected to the backward and forward switch valve, and a first oil passage intercommunicating the first and second oil chambers. The spool and the spindle include therebetween a third oil chamber and a spring compressible by depression of the clutch pedal. The spool defines a throttling portion for throttling the first oil passage, and a first throttling passage and a second throttling passage for connecting the third oil chamber to a first drain port defined in the valve housing when the clutch pedal is depressed. The first and second throttle passage are disposed such that sliding of the spool establishes in an alternative way an initial state in which the first throttle passage is connected to the first drain port and the second throttle passage is closed by the valve casing and a declutched state in which the second and third oil chambers are placed in communication with each other by the first throttle passage and the second throttle passage is connected to the first drain port. The spindle defines a drain passage to place the third oil chamber in communication with a second drain port defined in the valve casing only when the clutch pedal is adjacent an inoperative position.

The function of the inching valve will hereinafter be described with reference to FIGS. 1 through 4 of the accompanying drawings. As shown in FIG. 1, when the clutch pedal 30 is in the inoperative position, an oil pressure is applied from the output port P1 of the modulation valve MV to the backward and forward switch valve V1 through the first oil passage r1 defined between the valve casing 26 and the spool 28, whereby the vehicle is allowed to continue running.

Referring to FIG. 3, when the clutch pedal 30 is depressed to its stroke end, the spindle 31 causes the spool 28 to slide a sufficient distance to shut the first oil passage r1. In this state the output port 29 of the inching valve IV connected to the backward and forward switch valve V1 communicates with the third oil chamber C through the first throttle passage r2, and at the same time the third oil chamber C communicates with the first drain port D1 through the second throttle passage r3. As a result, the oil pressure applied to the backward and forward switch valve V1 is reduced thereby to stop the vehicle or to establish a declutched state.

Referring to FIG. 2, when the clutch pedal 30 is slightly returned from the declutched state, the spring 32 loses some of its urging force and the spool 28 is pushed back by a hydraulic pressure in the first oil chamber A for an amount corresponding to the lost urging force of the spring 32. As a result, the first oil passage r1 opens by a small amount determined by the throttling portion 28A of the spool 28, and the hydraulic pressure at the output port 29 increases by an amount corresponding to the opening amount of the first oil passage r1, thereby establishing a half-clutch state.

With the return slide of the spool 28 a balance between an inflow of oil from the second chamber B and an outflow of oil from the first drain D1 stabilizes the hydraulic pressure in the third oil chamber C at a certain value, maintains the spool 28 at a certain position, and maintains the hydraulic pressure at the output port 29 constant.

Therefore, as the clutch pedal 30 is gradually returned, the hydraulic pressure at the output port 29 increases by an amount corresponding to an amount of return of the pedal 30, which permits the vehicle to make a gentle start.

Referring to FIG. 4, when the clutch pedal is suddenly released from the depressed, declutched state, the return slide of the spindle 31 permits the spool 28 to be pushed by the hydraulic pressure in the first oil chamber A, thereby increasing the pressure in the third oil chamber C. The oil is then rapidly and sufficiently supplied from the third oil chamber C to the backward and forward switch valve V1 through the first throttle passage r2 and the output port 29. Thereafter the first oil passage r1 is opened. Therefore, a high hydraulic pressure is rapidly applied to the backward and forward switch valve to start the vehicle suddenly without an adverse influence of the modulation valve MV since the oil hardly flows from the output port P1 of the modulation valve MV and the hydraulic pressure applied to the main change speed valve V2 is not lowered.

Thus, this invention provides the foregoing apparatus having all of the clutching function, the modulating function and the sudden starting function. The apparatus is multi-functional, has a wide application and has a high commercial value.

Other advantages of this invention will be apparent from the following description.

BRIEF DESCRIPTION OF THE DRAWINGS

The drawings show a power transmission control apparatus embodying this invention, in which.

DESCRIPTION OF THE PREFERRED EMBODIMENT

Figure 1:
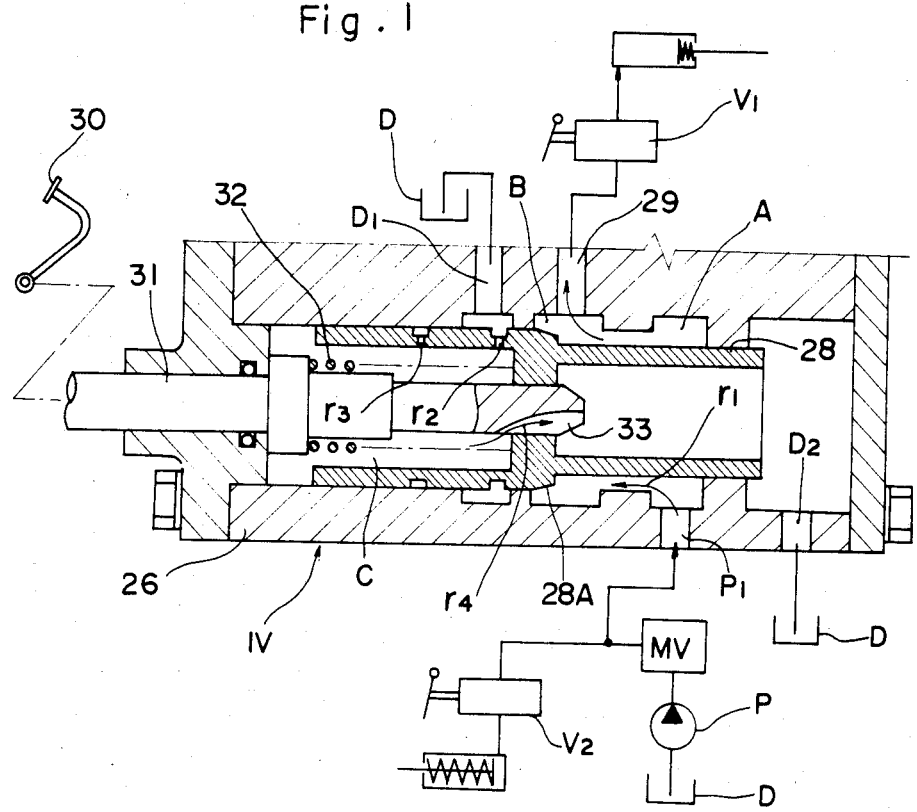
FIGS. 1 through 4 are sectional views of a principal portion for illustrating the functions thereof.
Figure 2:
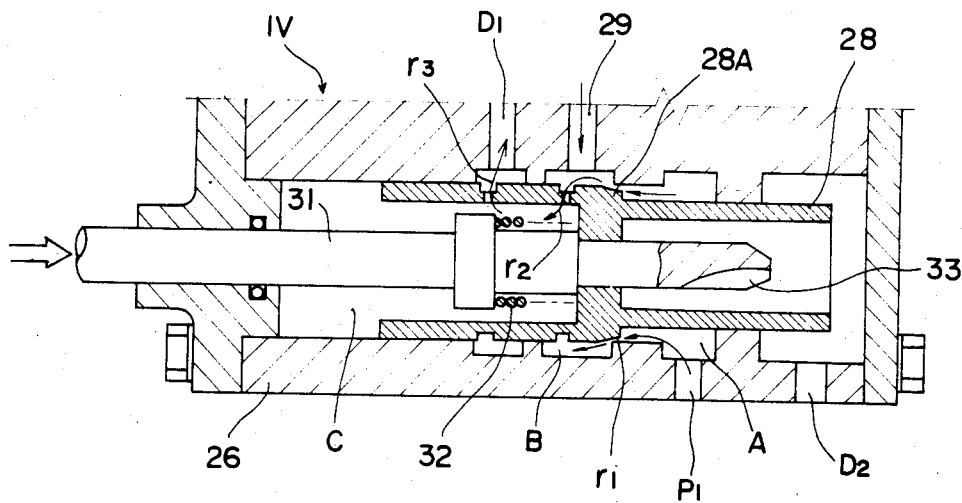
Figure 3:
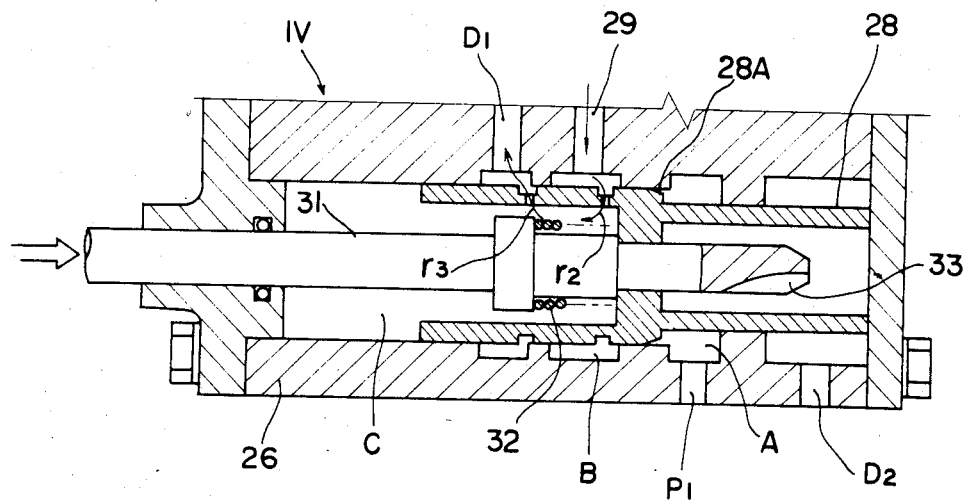
Figure 4:
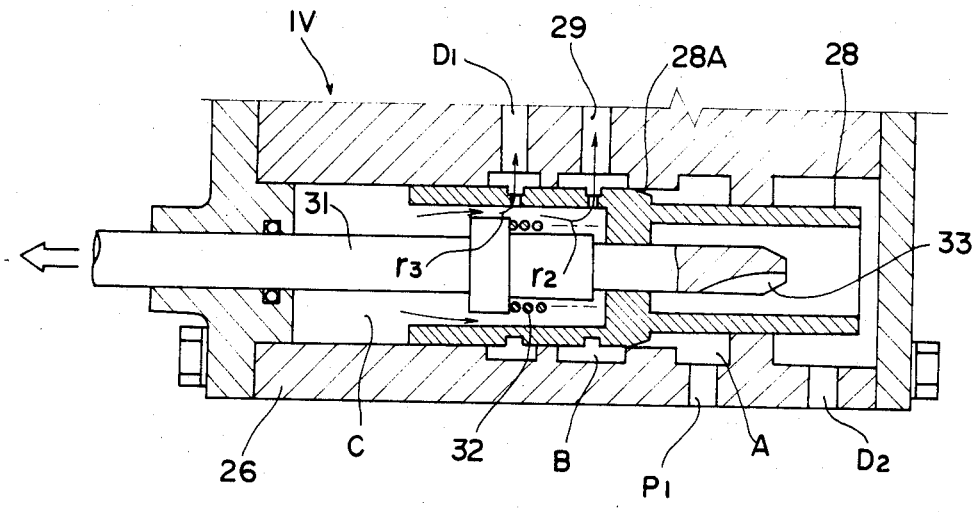
Figure 5:
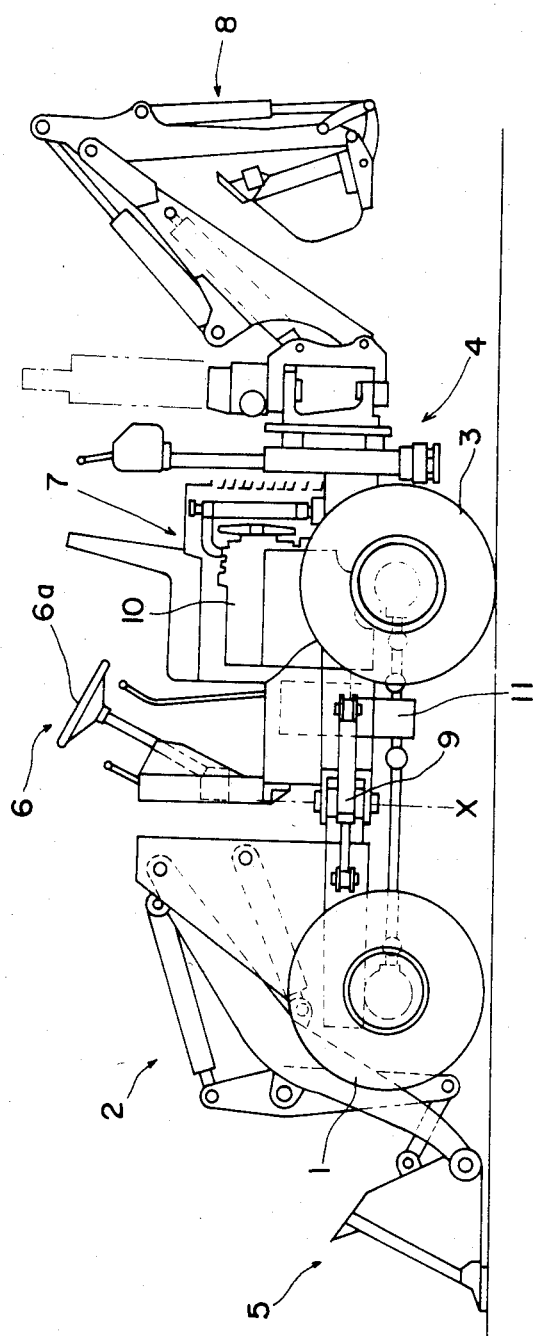
FIG. 5 is a side elevation of an earth moving vehicle.

Referring to FIG. 5, a working vehicle adapted for earth moving and excavating operations is shown comprising a forward body 2 having a pair of right and left front wheels 1 and a rearward body 4 having a pair of right and left rear wheels 3, the forward and rearward bodies 2, 4 being pivotable or flexible relative to each other on a vertical axis X. The forward body 2 includes a vertically movable front loader 5. The rearward body 4 includes a driver's section 6, a motor section 7, and a backhoe 8. A hydraulic cylinder 9 extends between the forward and rearward bodies 2, 4 for flexing the two bodies 2, 4 relative to each other by an amount corresponding to an amount of turn of a steering wheel 6a. The motor section 7 includes an engine 10 operatively connected to a transmission in a transmission case 11. The transmission changes an output of the engine 10 into plural speeds for driving the front wheels 1 and the rear wheels 3.

Figure 6:
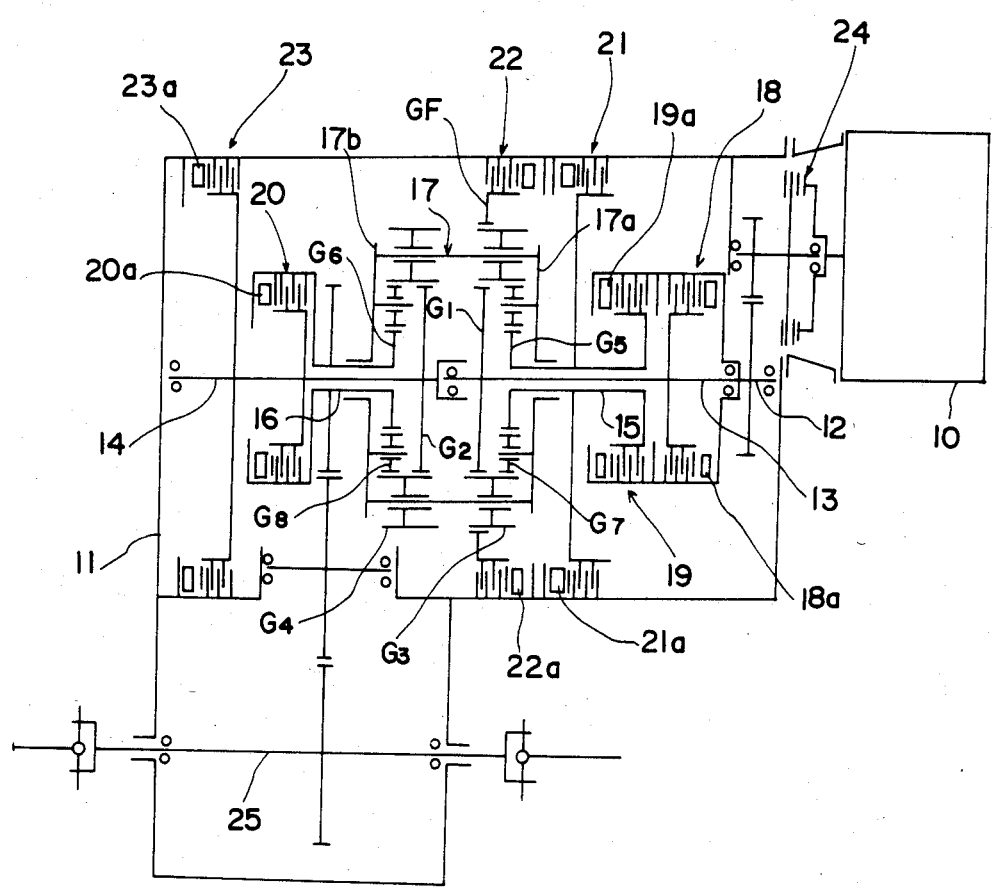
FIG. 6 is a schematic view of a transmission.

The transmission in the transmission case 11 will be described referring to FIGS. 6 and 7. The transmission includes an input shaft 12, a first intermediate shaft 13 and a second intermediate shaft 14 arranged coaxial to one another. The first intermediate shaft 13 carries a sleeve shaft 15 for backward driving relatively rotatably mounted thereon, and the second intermediate shaft 14 carries a sleeve shaft 16 for power output relatively rotatably mounted thereon. The two sleeve shafts 15 and 16 carry, relatively rotatably thereon, disc members 17a and 17b at both sides of a spider 17, respectively. A first multiplate clutch 18 is provided between the input shaft 12 and the first intermediate shaft 13. A second multiplate clutch 19 is provided between the input shaft 12 and the sleeve shaft 15 for backward driving. A third clutch 20 is provided between the second intermediate shaft 14 and the sleeve shaft 16 for power output. The first and second intermediate shafts 13 and 14 carry a first gear G1 and a second gear G2, respectively. The first gear G1 is in constant mesh with a third gear G3 relatively rotatably mounted on the spider 17. The second gear G2 is in constant mesh with a fourth gear G4 relatively rotatably mounted on the spider 17. The two sleeve shafts 15 and 16 carry a fifth gear G5 and a gear G6, respectively. The spider carries a seventh gear G7 and an eight gear G8 relatively rotatably mounted thereon. The seventh gear G7 is in mesh with both the third gear G3 and the fifth gear G5, and the eighth gear G8 is in mesh with both the fourth gear G4 and the sixth gear G6. The transmission further includes a first multiplate brake 21 for fixing the sleeve shaft 15 for backward driving to the case 11, a second multiplate brake 22 for fixing to the case 11 an internal gear GF in constant mesh with the third gear G3, and a third multiplate brake 23 for fixing the second intermediate shaft 14 to the case 11. The input shaft 12 is operatively connected to the engine 10 through a travelling clutch 24 and a gear interlocking mechanism. The sleeve shaft 16 for power output is operatively connected through a gear interlocking mechanism to an output shaft 25 for driving the front and rear wheels 1 and 3.

The above clutches and brakes 18-23 are constantly urged toward disengaged positions by hydraulic cylinders 18a-23a, respectively. The hydraulic cylinders 18a-23a are selectively supplied with pressure oil from a hydraulic pump P through a valve system. Thus, the described power transmission provides five forward speeds F1-F5 and two backward or reverse speeds R1 and R2, and includes a neutral position as well. More particularly, to provide the forward speeds the second and third clutches 19 and 20 and the first to third brakes 21-23 are selectively operated while maintaining the first clutch 18 engaged. To provide the backward speeds the third clutch 20 and the second third brakes 22 and 23 are selectively operated while maintaining the second clutch 19 engaged. The following table shows pressure oil supplies for each of the above speeds, in which O indicates that the oil is supplied and X indicates that the oil is drained.

TABLE

| Speeds | Objects under control | | | | | |
|---|---|---|---|---|---|---|
| | Clutches | | | Brakes | | |
| | 1st | 2nd | 3rd | 1st | 2nd | 3rd |
| Neutral | X | X | O | X | O | X |
| 1st forward | O | X | O | X | O | X |
| 2nd forward | O | X | X | X | O | O |
| 3rd forward | O | O | O | X | X | X |
| 4th forward | O | X | X | O | X | O |
| 5th forward | O | O | X | X | X | O |
| 1st backward | X | O | O | X | O | X |
| 2nd backward | X | O | X | X | O | O |

Figure 7:
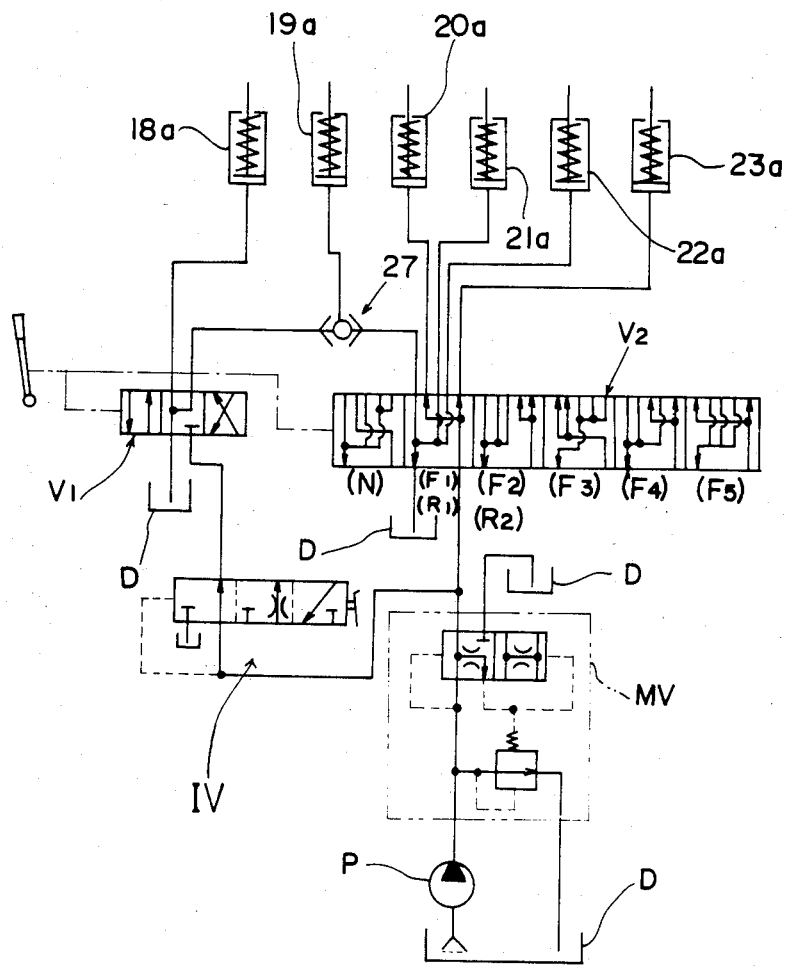
FIG. 7 is a diagram of a hydraulic system.

Referring to FIG. 7, the valve system includes a backward and forward switch valve V1 for applying a hydraulic pressure to the first and second clutches 18 and 19 in an alternative way, and a main change speed control valve V2 for selectively applying the hydraulic pressure to the second and third clutches 19 and 20 and to the first to third brakes 21–23 in order to select a speed. The two valves V1 and V2 are connected in parallel to the cylinder 19a for the second clutch 19 by way of a shuttle valve 27.

In order that the vehicle may start smoothly after a change speed operation, the valve system further includes a modulation valve MV between the main change speed control valve V2 and the pump P. The modulation valve MV increases the hydraulic pressure for the hydraulic cylinders 18a–23a after the hydraulic cylinders 18a–23a are filled with the pressure oil by operating the main change speed control valve V2 to connect the pump P to the hydraulic cylinders 18a–23a.

The valve system also includes a clutch controlling inching valve IV between the backward and forward switch valve V1 and an output port P1 of the modulation valve MV. This inching valve IV comprises a valve casing 26, a tubular spool 28 slidable in the valve casing 26, and a spindle 31 slidable in and relative to the spool 28 and operatively connected to a clutch pedal 30. The valve casing 26 and the spool 28 define therebetween a first oil chamber A connected to the output port P1 of the modulation valve MV, a second oil chamber B in communication with an output port 29 defined in the valve casing 26 and connected to the backward and forward switch valve V1, and a first oil passage r1 intercommunicating the first and second oil chambers A and B. The spool 28 and the spindle 31 include therebetween a third oil chamber C and a spring 32 compressible by depression of the clutch pedal 30. The spool 28 defines a throttling portion 28A for throttling the first oil passage r1, and a first throttling passage r2 and a second throttling passage r3 for connecting the third oil chamber C to a first drain port D1 defined in the valve housing 26 when the clutch pedal 30 is depressed. The first and second throttle passages r2 and r3 are disposed such that sliding of the spool 28 establishes in an alternative way an initial state in which the first throttle passage r2 is connected to the first drain port D1 and the second throttle passage r3 is closed by the valve casing 26 and a declutched state in which the second and third oil chambers B and C are placed in communication with each other by the first throttle passage r2 and the second throttle passage r3 is connected to the first drain port D1. The spindle 31 includes a cutout groove 33 in a forward end thereof, the groove 33 defining a drain passage r4 to place the third oil chamber C in communication with a second drain port D2 defined in the valve casing 26 only when the clutch pedal 30 is adjacent an inoperative position. The cutout groove 33 is shaped to vary a drain rate with an amount of movement of the spindle 31.

This construction described above is operable to stop the vehicle running when the clutch pedal 30 is depressed, to thereafter start the vehicle in a slow and gentle manner by gradually returning the clutch pedal 30, and to start the the vehicle suddenly and rapidly by rapidly returning the clutch pedal 30, as particularly described hereinbefore with reference to FIGS. 1 through 4.

It will be understood that reference D in the drawings indicates drain tanks.

The foregoing control apparatus including the modulation valve MV and the inching valve IV is applicable not only to earth moving vehicle but also to any other working vehicles.

What is claimed is:

1. A power transmission control apparatus comprising a main change speed control valve (V2), a hydraulic pump (P) for supplying pressure oil to the main change speed control valve (V2), hydraulic cylinders (18a–23a) for controlling clutches, a modulation valve (MV) disposed between the main change speed control valve (V2) and the hydraulic pump (P) for gradually increasing a hydraulic pressure for the hydraulic cylinders (18a–23a) after the hydraulic cylinders (18a–23a) are filled with the pressure oil by operating the main change speed control valve (V2) to connect the hydraulic pump (P) to the hydraulic cylinders (18a–23a), and a backward and forward switch valve (V1) connected to an output port (P1) of the modulation valve (MV) through an inching valve (IV) for controlling the clutches, wherein said inching valve (IV) comprises a valve casing (26), a tubular spool (28) slidable in the valve casing (26), and a spindle (31) slidable in and relative to the spool (28) and operatively connected to a clutch pedal (30), the valve casing (26) and the spool (28) defining therebetween a first oil chamber (A) connected to the output port (P1) of the modulation valve (MV), a second oil chamber (B) in communication with an output port (29) defined in the valve casing (26) and connected to the backward and forward switch valve (V1), and a first oil passage (r1) intercommunicating the first and second oil chambers (A,B), the spool (28) and the spindle (31) including therebetween a third oil chamber (C) and a spring (32) compressible by depression of the clutch pedal (30), the spool (28) defining a throttling portion (28A) for throttling the first oil passage (r1), and a first throttle passage (r2) and a second throttle passage (r3) for connecting the third oil chamber (C) to a first drain port (D1) defined in the valve housing (26) when the clutch pedal (30) is depressed, the first and second throttle passages (r2, r3) being disposed such that sliding of the spool (28) establishes in an alternative way an initial state in which the first throttle passage (r2) is connected to the first drain port (D1) and the second throttle passage (r3) is closed by the valve casing (26) and a declutched state in which the second and third oil chambers (B,C) are placed in communication with each other by the first throttle passage (r2) and the second throttle passage (r3) is connected to the first drain port (D1), and the spindle defining a drain passage (r4) to place the third oil chamber (C) in communication with a second drain port (D2) defined in the valve casing (26) only when the clutch pedal (30) is adjacent an inoperative position.

2. A power transmission control apparatus as claimed in claim 1 wherein the drain passage (r4) comprises a cutout groove (33) defined in a forward end of the spindle (31), the cutout groove (33) being shaped to vary a drain rate with an amount of movement of the spindle (31).

* * * * *